United States Patent
Ohishi et al.

(10) Patent No.: US 9,369,216 B2
(45) Date of Patent: Jun. 14, 2016

(54) COMMUNICATION APPARATUS

(71) Applicant: KABUSHIKI KAISHA TOSHIBA, Minato-ku, Tokyo (JP)

(72) Inventors: Takafumi Ohishi, Kanagawa-ken (JP); Kazuhiro Inoue, Tokyo (JP); Shuichi Obayashi, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 116 days.

(21) Appl. No.: 14/029,414

(22) Filed: Sep. 17, 2013

(65) Prior Publication Data

US 2014/0080429 A1 Mar. 20, 2014

(30) Foreign Application Priority Data

Sep. 18, 2012 (JP) ................................ 2012-205056

(51) Int. Cl.
*H04B 1/10* (2006.01)
*H04B 13/00* (2006.01)
*H04B 1/04* (2006.01)

(52) U.S. Cl.
CPC .................................. *H04B 13/005* (2013.01)

(58) Field of Classification Search
CPC ...... H04B 13/005; H04B 1/0475; H04B 1/10; H04B 15/02; H04W 28/048
See application file for complete search history.

(56) References Cited

U.S. PATENT DOCUMENTS

| | | | | |
|---|---|---|---|---|
| 6,091,366 A * | 7/2000 | Zhang et al. | ............ | 343/700 MS |
| 6,763,254 B2 * | 7/2004 | Nishikawa | ................. | 455/575.7 |
| 2002/0041254 A1 * | 4/2002 | Nakano | ..................... | H01Q 1/40 343/700 MS |
| 2005/0146467 A1 * | 7/2005 | He | ....................... | H01Q 9/0442 343/700 MS |
| 2011/0074444 A1 * | 3/2011 | Makiranta et al. | ............ | 324/663 |
| 2011/0183721 A1 * | 7/2011 | Hill et al. | ....................... | 455/566 |
| 2012/0157175 A1 * | 6/2012 | Golko | ................... | G06F 1/1698 455/575.7 |
| 2012/0306721 A1 * | 12/2012 | Okegawa | ............. | H01Q 9/0421 343/905 |
| 2012/0329531 A1 * | 12/2012 | Park | ..................... | H04M 1/0202 455/572 |
| 2013/0260708 A1 * | 10/2013 | Rofougaran | .................. | 455/280 |
| 2014/0225787 A1 * | 8/2014 | Ramachandran | ........ | H01Q 1/24 343/702 |

FOREIGN PATENT DOCUMENTS

| | | |
|---|---|---|
| JP | 10229357 A | 8/1998 |
| JP | 2001077735 A | 3/2001 |
| JP | 2003037566 A | 2/2003 |

OTHER PUBLICATIONS

Japanese Office Action dated Jul. 11, 2014, issued in counterpart Japanese Application No. 2012-205056.
Masanori Kurata, et al., "Communication Apparatus Performing Electrostatic Coupling Formed Between an Electrode Unit and a Living Body," U.S. Appl. No. 13/051,194, filed Mar. 18, 2011.

* cited by examiner

*Primary Examiner* — Andrew Wendell
(74) *Attorney, Agent, or Firm* — Holtz, Holtz & Volek PC

(57) ABSTRACT

According to one embodiment, a communication apparatus includes a substrate, a communication circuit, a first signal line, an insulator, and a first conductor. The substrate includes a ground. The communication circuit is provided on the substrate. The first signal line is connected to the communication circuit and is electrically connected to the outer surface of the first conductor. The insulator surrounds the substrate. The first conductor surrounds the insulator.

21 Claims, 12 Drawing Sheets

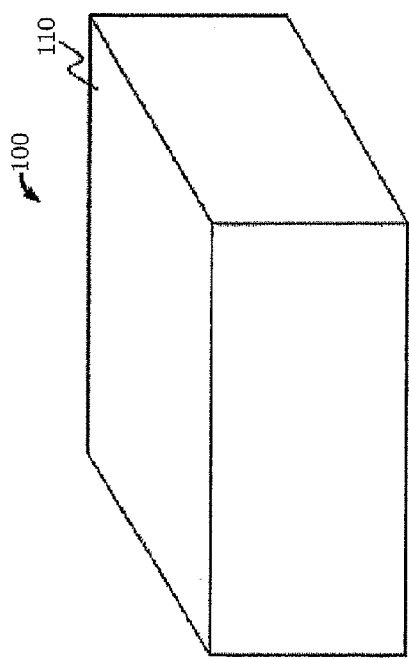
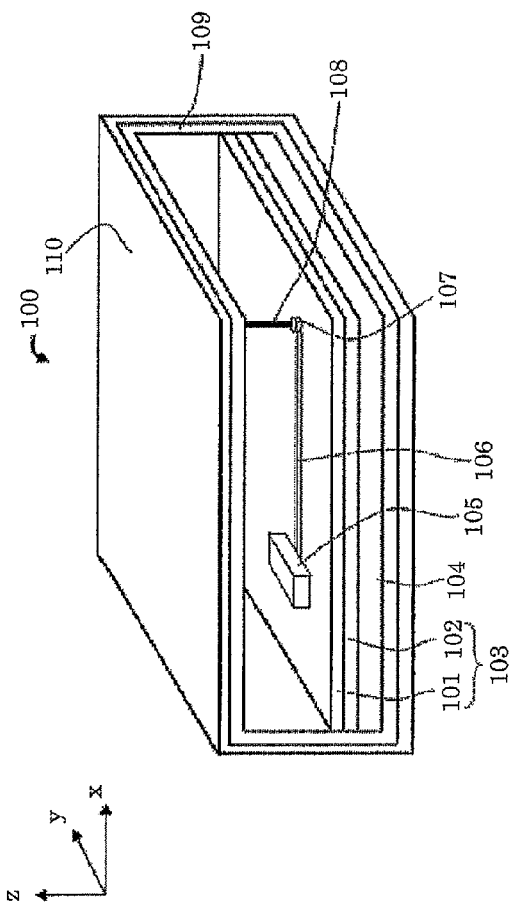

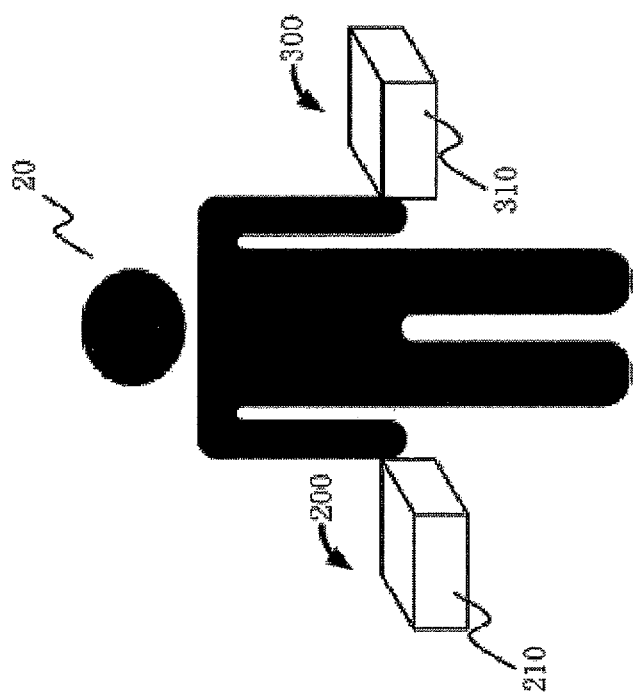

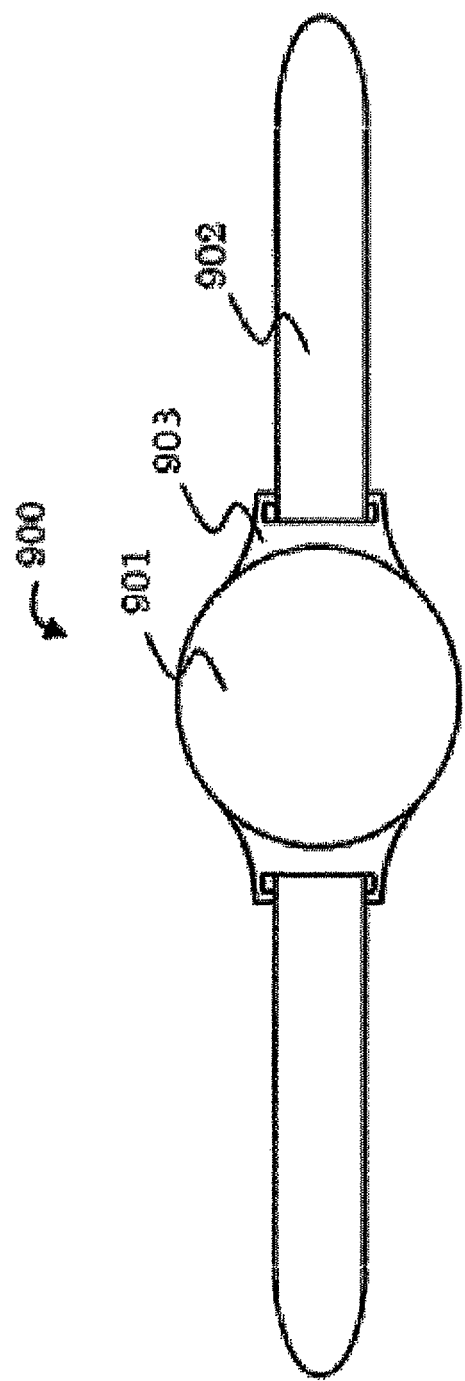
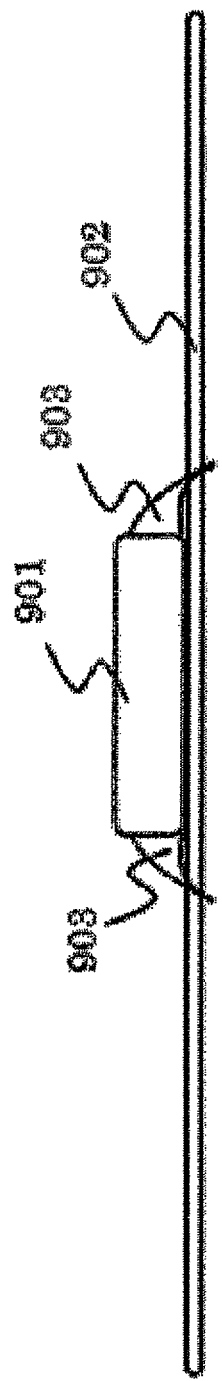
FIG. 9(a)
FIG. 9(b)

COMMUNICATION APPARATUS

CROSS REFERENCE TO RELATED APPLICATIONS

This application is based upon and claims the benefit of priority from prior Japanese Patent Application No. 2012-205056, filed Sep. 18, 2012, the entire contents of which are incorporated herein by reference.

FIELD

Embodiments described herein relate generally to a communication apparatus.

BACKGROUND

Technology has been proposed to transmit an electric potential difference between electrodes coupled by using the human body as a part of a transmission path. According to this technology, for example, a transceiver and a receiver, each having two electrodes, have been used. One of the electrodes is a signal electrode connected to a signal line, and the other is a ground reference electrode connected to a ground having a reference potential. To transmit an electric potential difference between the signal electrode and the ground reference electrode, the signal electrodes of the transmitter and the receiver are coupled mainly via the human body, and the ground reference electrodes are coupled mainly via the air or the land and transmit the reference potential.

With this structure, noise from another system or an electric potential fluctuation of a signal transmitted on the human body affects the reference potential. Such an electric potential fluctuation is caused by a coupling with the human body near the transceiver and the receiver. The instability caused by the electric potential fluctuation causes low communication quality.

SUMMARY OF THE INVENTION

In general, according to one embodiment, a communication apparatus includes a substrate, a communication circuit, a first signal line, an insulator, and a first conductor. The substrate includes a ground. The communication circuit is provided on the substrate. The first signal line is connected to the communication circuit and is electrically connected to the outer surface of the first conductor. The insulator surrounds the substrate. The first conductor surrounds the insulator.

BRIEF DESCRIPTION OF THE DRAWINGS

FIG. 1(a) is a perspective view of a communication apparatus according to a first embodiment, FIG. 1(b) is a cutaway diagram, with two sides removed, of the communication apparatus shown in FIG. 1(a)

FIG. 2 is a diagram showing an example of a situation in which the communication apparatus is used;

FIGS. 9(a) and 9(b) are diagrams showing a watch according to the modified third embodiment.

DETAILED DESCRIPTION

Hereinafter, various embodiments will be described with reference to the accompanying drawing as needed. In the embodiments, like reference numbers denote like elements, and duplicate descriptions are omitted.

First Embodiment

Figure 1C:
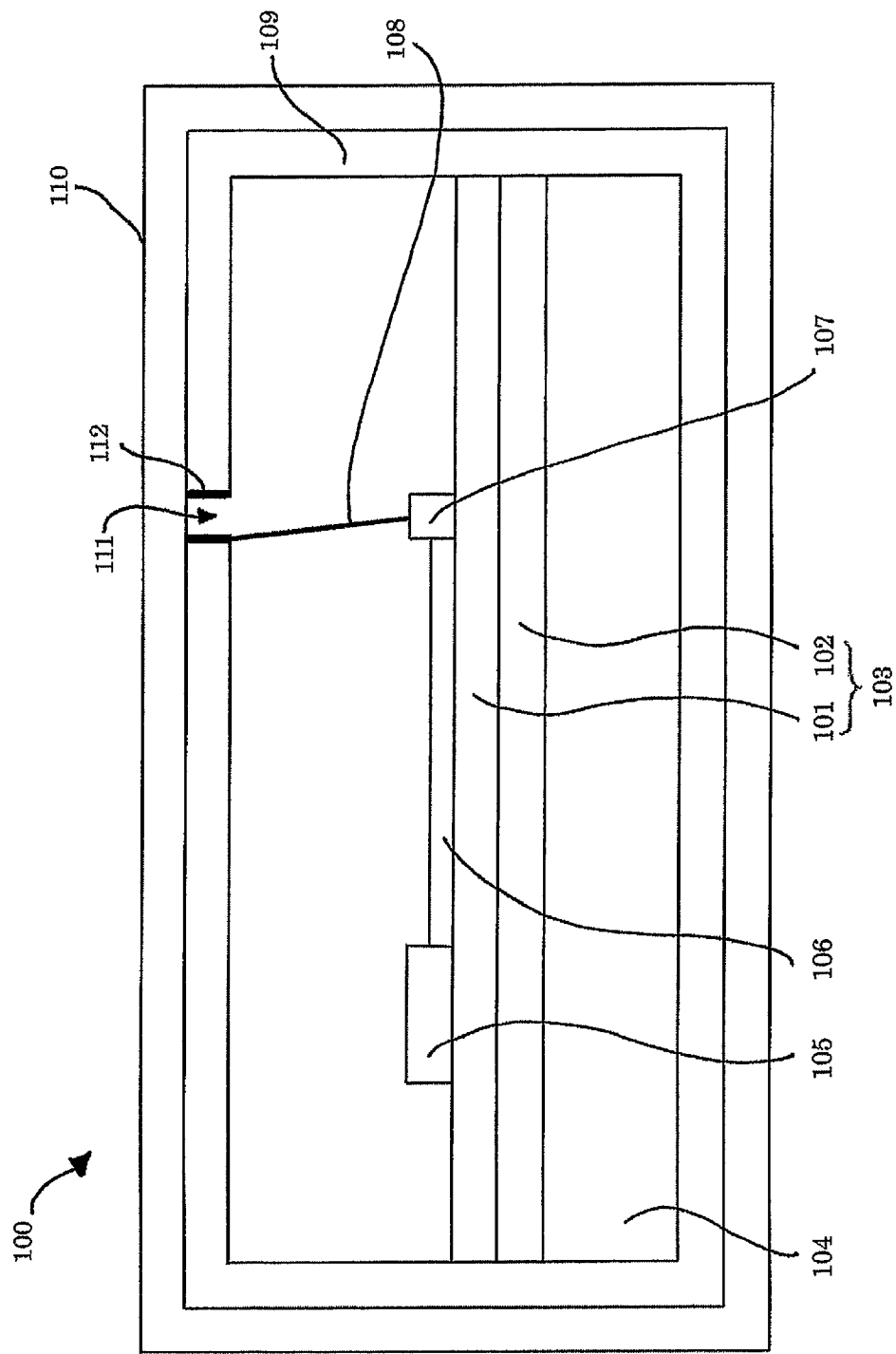
FIG. 1(c) is a sectional view of the communication apparatus.

FIG. 1(a) is a perspective view of a communication apparatus 100 according to the first embodiment. FIG. 1(b) is a cutaway diagram, with two sides removed, of the communication apparatus 100 shown in FIG. 1(a). FIG. 1(c) is a sectional view of the communication apparatus 100. The communication apparatus 100 can be a transceiver or a receiver. A communication system includes the transceiver and the receiver.

The communication apparatus 100 includes a substrate 103, a communication circuit 105, and a conductor 110. The substrate 103 includes a dielectric material layer 101 and a first ground 102. The first ground 102 is a conductor having a reference potential, and the first ground 102 is formed of a metal layer such as copper or gold, for example.

If the communication apparatus 100 is a transmitter, the communication circuit 105 includes a radio-frequency signal source, a modulator, and an amplifier. If the communication apparatus 100 is a receiver, the communication circuit 105 includes an amplifier and a demodulator.

The conductor 110 is formed of a conductive material such as conductive ink, a transparent conductive material, or a conductive sheet. The conductor 110 is used as a signal electrode which is coupled with a conductor of another communication apparatus of the communication system via the human body. The conductor 110 and the substrate 103 are insulated from each other by an insulator which is provided between them. For example, a housing 109 made of plastic is provided around the communication circuit 105 and the substrate 103, and the conductor 110 is provided so as to cover the surface of the housing 109. In this case, when conductive ink is used as the conductor 110, the conductor 110 can easily be formed on the outer surface of the housing 109 having any shape. When a transparent conductive material is used as the conductor 110, a user can look at information displayed on a screen and at an operating unit, even if the conductor 110 is provided on a display and an operating unit of the communication apparatus 100.

Hereafter, the insulator provided between the conductor 110 and the substrate 103 is explained as a housing 109. The substrate 103 is fixed to the housing 109 by a supporting member 104. The substrate 103 can alternatively be directly fixed to the housing 109 without the supporting member 104.

The communication circuit 105 and the outer surface of the conductor 110 are connected via a first signal line 106, a terminal 107, a second signal line 108, and a through-hole 111 formed through the housing 109, as shown in FIG. 1(c). An inner surface 112 of the through-hole 111 is coated or plated with metal or another conductive material such that the through-hole 111 is electrically connected to the conductor 110. One end of the first signal line 106 is connected to the communication circuit 105. The other end of the first signal line 106 and one end of the second signal line 108 are connected to the terminal 107. The other end of the second signal line 108 is connected to the through-hole 111. Alternatively, the first signal line 106 can be directly connected to the second signal line 108 by soldering without using terminal 107. As a further alternative, the communication circuit 105 and the conductor 110 can be connected via one signal line and the through-hole 111.

Figure 1D:
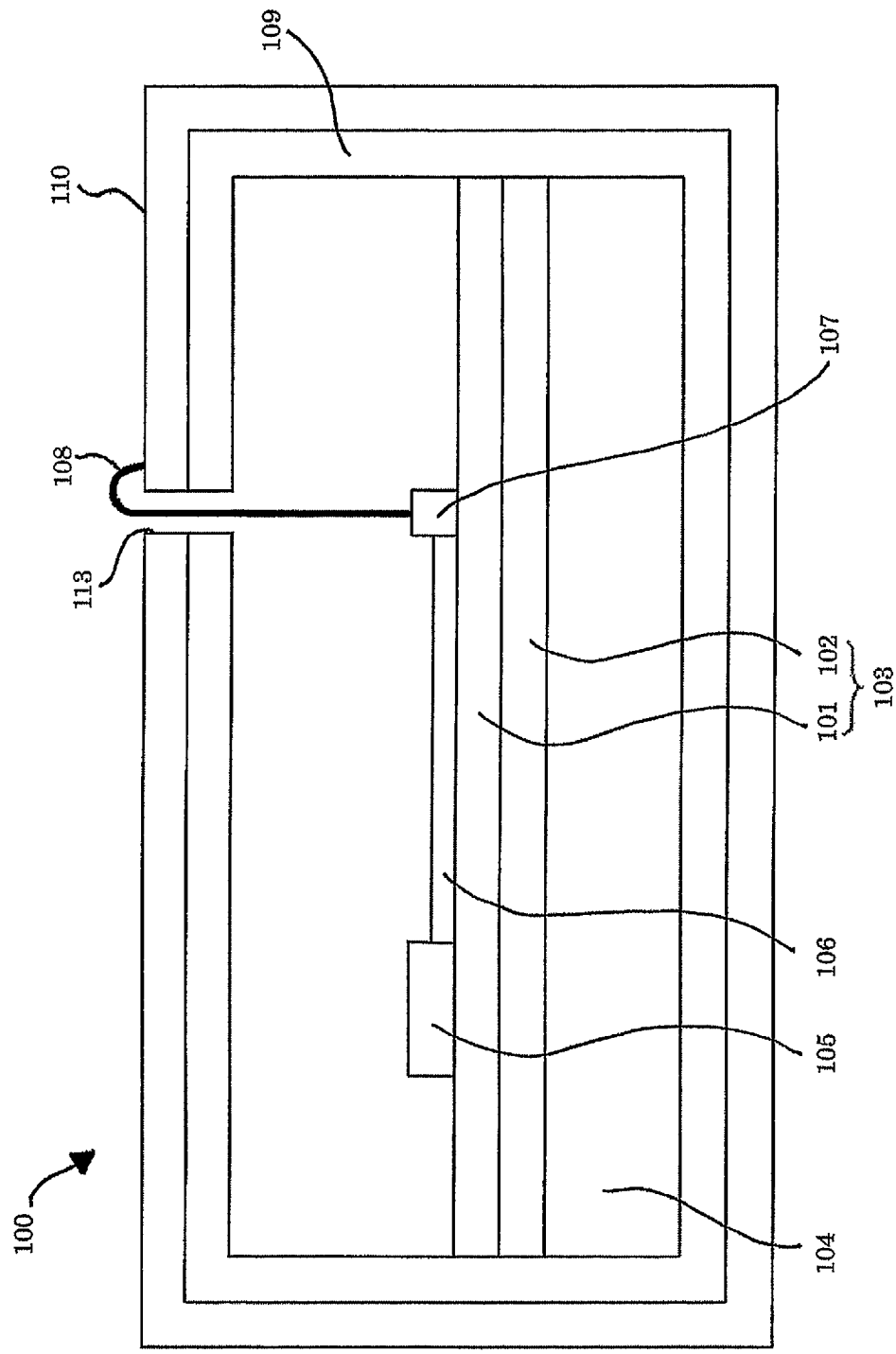
FIG. 1(d) is a sectional view of a communication apparatus according to a modified first embodiment.

In a modification of the first embodiment shown in FIG. 1(d), a non-plated through-hole 113 may be formed through both the conductor 110 and the housing 109. In this modification, the second signal line 108 extends through the non-plated through-hole 113 and is connected directly to an outer surface of the conductor 110, instead of being connected to the conductor 110 via the through-hole 111 as in the first embodiment.

Returning to the first embodiment, the through-hole 111 transmits a signal supplied from the communication circuit 105 to the conductor 110, if the communication apparatus 100 is a transceiver. The through-hole 111 transmits a signal supplied from the conductor 110 to the communication circuit 105, if the communication apparatus 100 is a receiver.

One end of the first signal line 106 provided on the substrate 103 and a second ground (not shown) are connected to the communication circuit 105. The second ground has the same electric potential as the first ground 102. The second ground is connected to the first ground 102 by, for example, a through-hole or the like. The terminal 107 has an internal conductor and an external conductor, and the first signal line 106 is connected to the internal conductor. The internal conductor and the external conductor are insulated from each other. A third ground (not shown) connects the external conductor of the terminal 107 to the first ground 102 by a through-hole or the like. In other words, the communication circuit 105 and the terminal 107 formed on the substrate 103 each have an individual ground (the second and third grounds, respectively) which is connected to the first ground 102. Thus, the first, second, and third grounds all have the same electric potential.

Hereinafter, connection using the communication apparatus will be described with reference to FIG. 2. An example in which a transceiver 200 sends signals to a receiver 300 will be described. The configurations of the transceiver 200 and the receiver 300 are same as the communication apparatus 100. FIG. 2 shows a situation in which a user touches or holds a hand over the conductor 210 of the transceiver 200 and the conductor 310 of the receiver 300.

If the signal is supplied from the communication circuit of the transceiver 200 to the conductor 210, electric potential based on an electric field according to the signal is generated by capacitive coupling between the conductor 210 and the human body 20. The signal propagates on a surface of the human body, and reaches a surface of the hand touching or held over the receiver 300. Then, capacitive coupling is caused between the conductor 310 of the receiver 300 and the human body 20, and electric potential is generated on the conductor 310. The electric potential is based on the electric field according to the signal on the surface of the human body 20. The electric potential is input to the communication circuit of the receiver 300 from the conductor 310 via the first and second signal lines. The communication circuit of the receiver 300 detects the electric potential difference between the electric potential input from the conductor 310 via the first and the second signal lines and the electric potential of the second ground.

The second ground of the receiver 300 is connected to the first ground which is included in the substrate, and the substrate is surrounded by the conductor 310. The electric potential of the first ground provided inside the conductor 310 is stable and less affected by the electric field of the surface of the human body.

To avoid the electric field generated at the outside of the conductor 310 affecting the inside of the conductor 310, the conductor 310 should be thicker than the value δ given by the equation (1), $$\delta = \sqrt{\frac{2}{\omega\mu\sigma}} \quad (1)$$

in which ω represents an angular frequency of a signal having a carrier frequency used in the communication, μ represents a magnetic permeability of the conductor, and σ represents electrical conductivity of the conductive material. When the conductor 310 is thicker than the value δ, the conductor 310 does not pass therethrough the electromagnetic wave having an angular frequency more than ω expressed in the equation (1). Therefore, inside of the conductor 310, no electric field generated at the outside of the conductor 310 exists, and the electric potential becomes stable.

Figure 3:
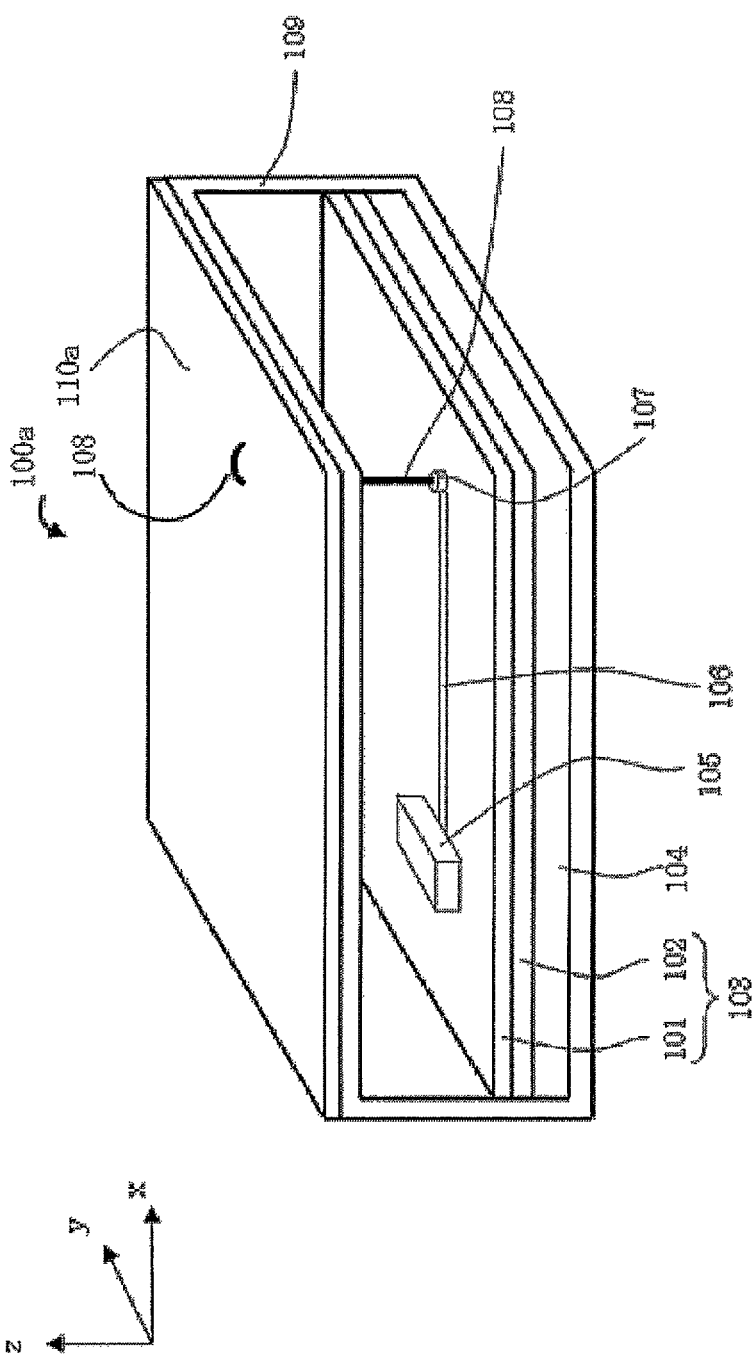
FIG. 3 is a cutaway diagram schematically showing a comparison example.

A comparative experiment between the communication apparatus 100 according to this embodiment and a comparison example has been conducted. FIG. 3 shows the comparison example. The communication apparatus 100a of the comparison example has a conductor 110a provided only on the upper side of the housing, and the first ground 102 and the conductor 110a face each other across the dielectric material layer 101 and the housing 109, but the first ground 102 of the communication apparatus 100a is not surrounded by the conductor 110a. When the conductor 110a touches or comes close to the human body, the first ground 102 exists in the electric field on the human body surface. Therefore, the electric potential of the ground reference electrode is affected by the electric field on the human body surface, and it becomes unstable. This causes depression of the received signal strength, and the communication quality deteriorates.

In the comparative experiment, the volume of the communication apparatus 100a of the comparison example was set to be the same as the volume of the communication apparatus 100 according to the first embodiment, and the received signal power transmitted from the same transmitting electrode was compared. The experiment showed that the received signal power of the communication apparatus according to the first embodiment is 17 dB higher than that of the communication apparatus 100a of the comparison example. As described above, the first ground 102 of the first embodiment is not affected by the electric field on the human body surface, and becomes stable.

According to the first embodiment, the first ground 102 is surrounded by the conductor 110 so as to reduce the effects on the first ground 102 from the electric field outside of the conductor 110, and the electric potential of the ground 102 becomes stable. This increases the receiving signal power and improves the communication quality.

Second Embodiment

Figure 4A:
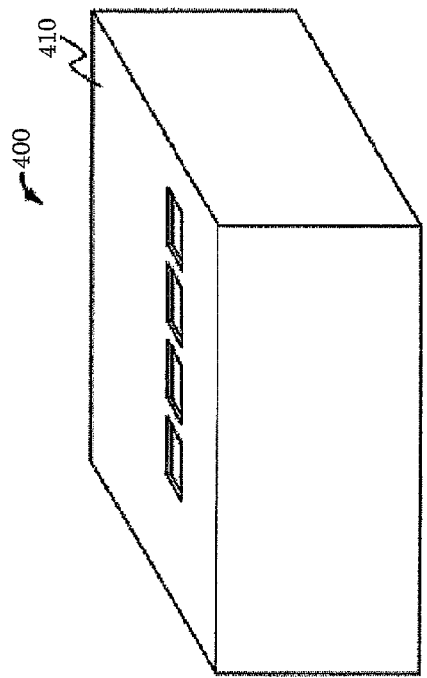
FIG. 4(a) is a perspective view of a communication apparatus according to a second embodiment.
Figure 4B:
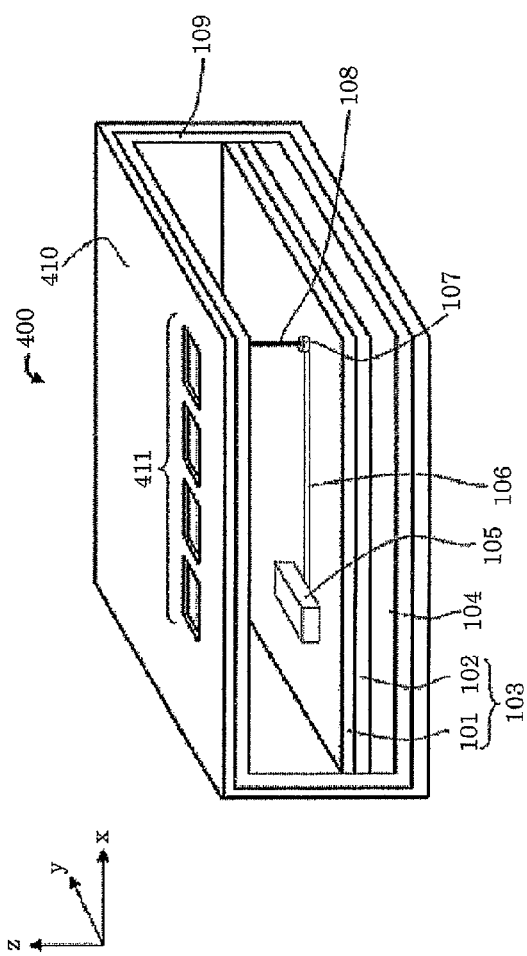
FIG. 4(b) is a cutaway diagram, with two sides removed, of the communication apparatus shown in FIG. 4(a)

FIG. 4 (a) is a perspective view of a communication apparatus 400 according to the second embodiment. FIG. 4(b) is a cutaway diagram, with two sides removed, of the communication apparatus 400 shown in FIG. 4(*a*). In the second embodiment, components similar to those in the first embodiment will be designated by the same reference numerals and detailed description thereof may not be repeated.

The communication apparatus 400 includes a conductor 410 having at least one opening. The material of the conductor 410 can be the same as the material of the conductor 110 described in the first embodiment. The conductor 410 can include one or more openings. As an example the conductor 410 shown in FIGS. 4(*a*) and 4(*b*) has four rectangular openings 411.

The longest side of each opening 411 has a length l which satisfies l<λ/2, where λ represents the wavelength of the signal having a maximum carrier frequency used in the communication. If the length l, which is the longest side of the opening 411, is shorter than λ/2, the opening 411 does not pass therethrough the electromagnetic wave having a wavelength longer than λ. Therefore, even if the openings are provided, the first ground 102 is not affected by the electric field at the outside of the conductor 410, and the first ground keeps a stable state. The first ground 102 of the communication apparatus 400 is surrounded by the conductor 410 having at least one opening 411, and the opening 411 satisfies l<λ/2. In this embodiment, if the opening 411 satisfies l<λ/2, the first ground 102 is still considered to be "surrounded" by the conductor 410.

When the opening 411 is provided, a display or a switch can be provided in the opening 411. The display can show information relating to the communication apparatus 400, and a user can operate the communication apparatus 400 by the switch.

The shape of the openings 411 seen along the perpendicular direction to the surface of the conductor 410 is not limited to rectangular. The shape can be a trapezoid, a triangle, or a circle, in which a distance between the farthest two points on the edge of the opening 411 is shorter than λ/2, where λ represents the wavelength of the signal having the maximum carrier frequency used in the communication. The wave length of the signal having the maximum carrier frequency used in the communication is the wavelength of the electromagnetic wave which has the maximum frequency among the electromagnetic waves generated on the human body surface by the communication apparatus 400.

Third Embodiment

Figure 5:
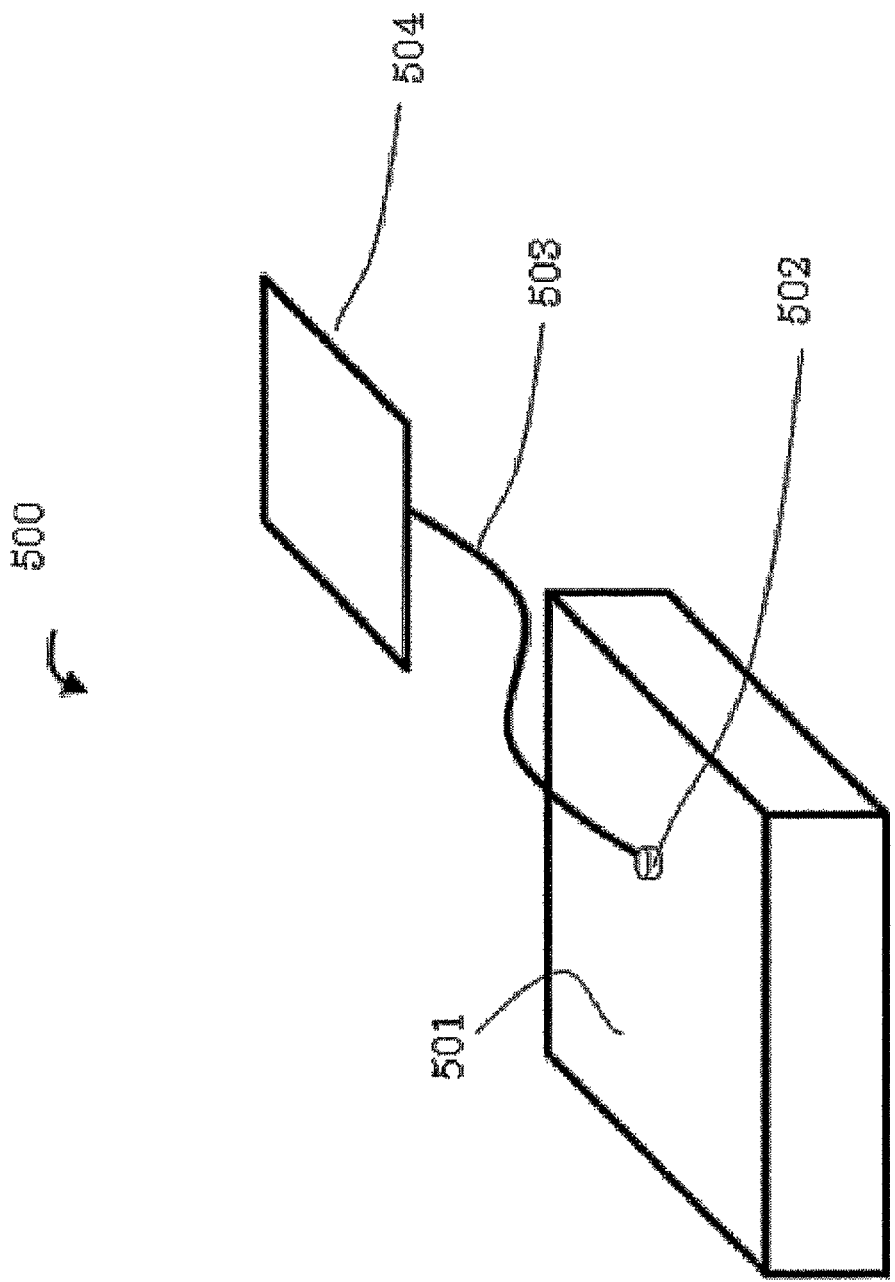
FIG. 5 is a diagram schematically showing a communication apparatus according to a third embodiment.

FIG. 5 is a diagram schematically showing a communication apparatus according to the third embodiment. The communication apparatus 500 includes a first conductor 501, a second terminal 502 provided on the first conductor 501, a third signal line 503 having one end connected to the second terminal 502, and a second conductor 504 connected to another end of the third signal line 503. The first conductor 501 and the second conductor 504 are conductive sheets such as copper foil, conductive ink, or transparent conductive materials, for example. The elements inside and surrounded by the first conductor 501 of the communication apparatus 500 are same as the elements inside and surrounded by the conductor 110 of the communication apparatus 100, so detailed description thereof may not be repeated.

The second terminal 502 is electrically connected to the first conductor 501. The second terminal 502 may be connected to the first conductor 501 at the position of a plated through-hole 111 formed through the housing 109 as described above with respect to the first embodiment. Alternatively, the second terminal 502 can be provided so as to be in contact with the first conductor at the position of a non-plated through-hole 113 formed through the conductor 110 and the housing 109 as described with respect to the modified first embodiment. As a further alternative, the second terminal 502 can be provided at a place distant from a through-hole 111 or a non-plated through-hole 113.

The first conductor 501 can receive an electric field at a place distant from the housing, because the second conductor 504 is connected to the first conductor 501. Because of this structure, the communication apparatus according to this embodiment can adapt to various devices.

Figure 6:
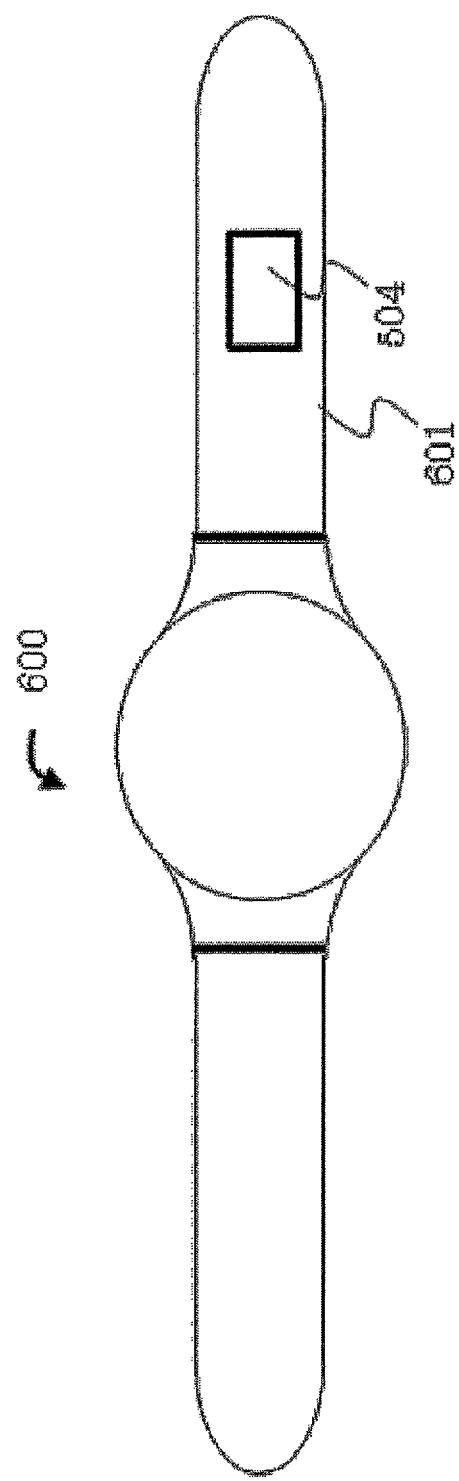
FIG. 6 is a diagram showing a watch according to the third embodiment.

For example, the communication apparatus according to this embodiment can be adapted to a watch as shown in FIG. 6. In this case, the communication circuit 105 and the first conductor 501 are built in the main body of the watch 600, and the second conductor 504 is provided on a strap 601 of the watch 600. Although the first conductor 501 provided in the main body of the watch 600 is distant from the human body surface, the communication circuit 105 can receive an electric field on the human body surface via the second conductor 504.

Figure 7:
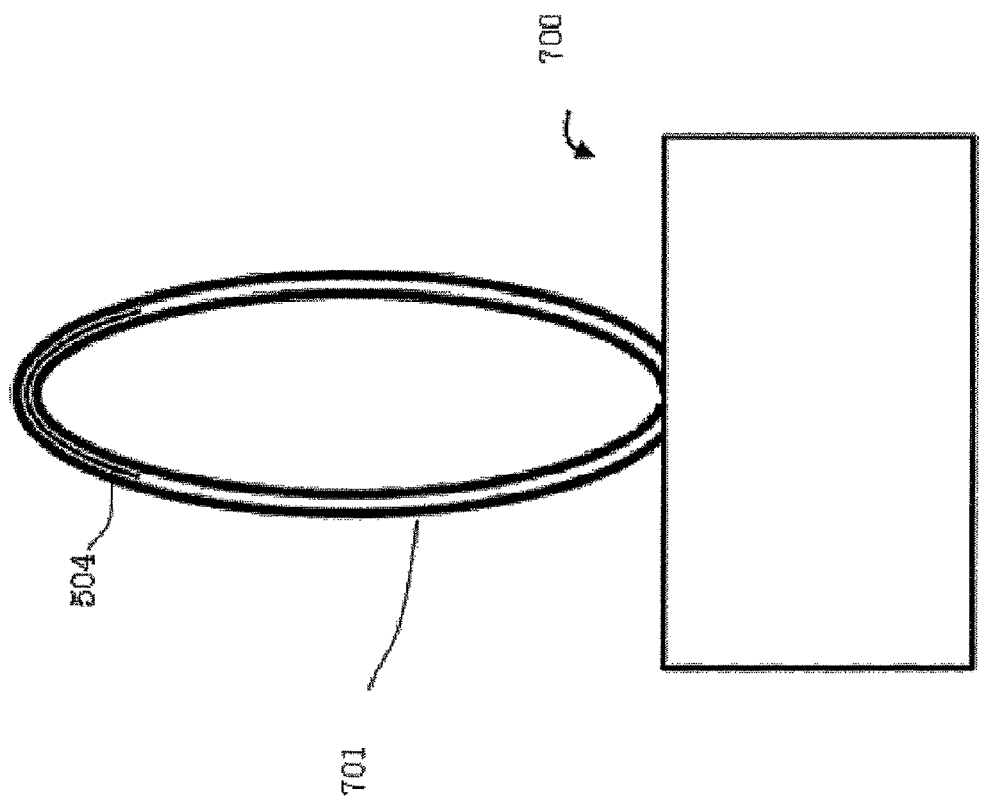
FIG. 7 is a diagram showing an ID card holder which has a strap according to the third embodiment.

The communication apparatus according to this embodiment can be adapted to an ID card holder shown in FIG. 7. In this case, the second conductor 504 is provided on the strap 701 which is used to hang the ID card from a user's neck. When a user wears the ID card holder, the strap 701 and the second conductor 504 touch the user's neck, and the second conductor 504 can receive the electric field on the human body surface. Therefore the communication becomes stable.

The communication apparatus can include a plurality of second conductors 504. If a plurality of second conductors 504 are used, a diversity effect by which a sensitivity of the communication apparatus increases can be achieved.

Modification

Figure 8:
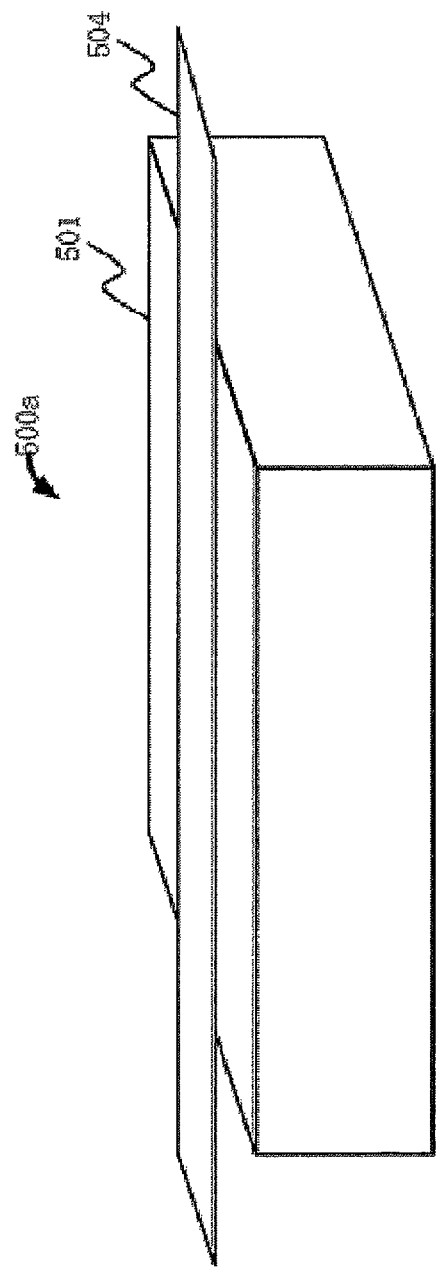
FIG. 8 is a diagram schematically showing a communication apparatus according to a modified third embodiment.

FIG. 8 is a diagram schematically showing a communication apparatus according to a modified third embodiment. The communication apparatus 500*a* has the first conductor 501, and the second conductor 504 is located proximally to the first conductor 501. Specifically, the distance between the first conductor 501 and the second conductor 504 should be within a range in which coupling caused by the electrostatic field becomes strong. The range in which the coupling caused by the electrostatic field becomes strong is equal to or shorter than λ/(2π), where λ represents a wavelength of a signal having a carrier frequency used in the communication.

If the first conductor 501 and the second conductor 504 are provided close to each other and a signal is input to the first conductor 501 from the communication circuit 105, capacitive coupling is caused between the second conductor 504 and the first conductor 501, and the electric potential of the first conductor 501 is transmitted to the second conductor 504. In this case, if the second conductor 504 is placed close to the human body, the capacitive coupling is caused between the second conductor 504 and the human body, and an electric field according to the signal is caused on the human body surface. The signal propagates on the human body surface, and reaches the other communication terminal. When the second conductor 504 receives a signal from the other communication terminal, the capacitive coupling is caused between the first conductor 501 and the second conductor 504, and the signal is input to the communication circuit 105 via the first conductor 501.

In this way, the communication circuit 500*a* can generate the electric field on the human body surface by the electric potential of the first conductor 501 without using the terminal 502 and the third signal line 503 which is included in the communication circuit 500 shown in FIG. 5.

In this modification, a part of the first conductor 501 may be arranged substantially parallel to a part of the second conductor 504. The electric potential between the first conductor 501 and the second conductor increases as an area in which the first conductor 501 and the second conductor 504 are close to each other increases, and the received signal strength increases.

FIGS. 9(*a*) and 9(*b*) show a watch as an example of the communication apparatus according to the modification of the third embodiment. The watch 900 includes a strap and a main body. The first ground having a reference potential and the communication circuit are provided in the main body, and the main body is surrounded by a first conductor 901. The first ground, the communication circuit, and the first conductor 901 are the same as those explained in the first to third embodiments. Fixing units 903 to fix the strap are provided on the main body. The fixing units 903 have slits to insert the strap. The strap is made of a second conductor 902, or the inside of the strap can be made of another material and covered with the second conductor 902. The first conductor 901 provided around the main body and the second conductor 902 provided on the strap are closely situated and the adjacent parts are arranged substantially in parallel.

By arranging the first conductor 901 and the second conductor 902 close to each other, the electric field can be generated on the human body surface which is distant from the first conductor 901. The electric field is generated by the electric potential of the first conductor 901 without connecting the first conductor 901 and the second conductor 902 by a terminal or a signal line. The second conductor 902 can receive the electric field on the human body surface, and the communication apparatus can stably communicate with another communication apparatus.

Fourth Embodiment

Figure 10:
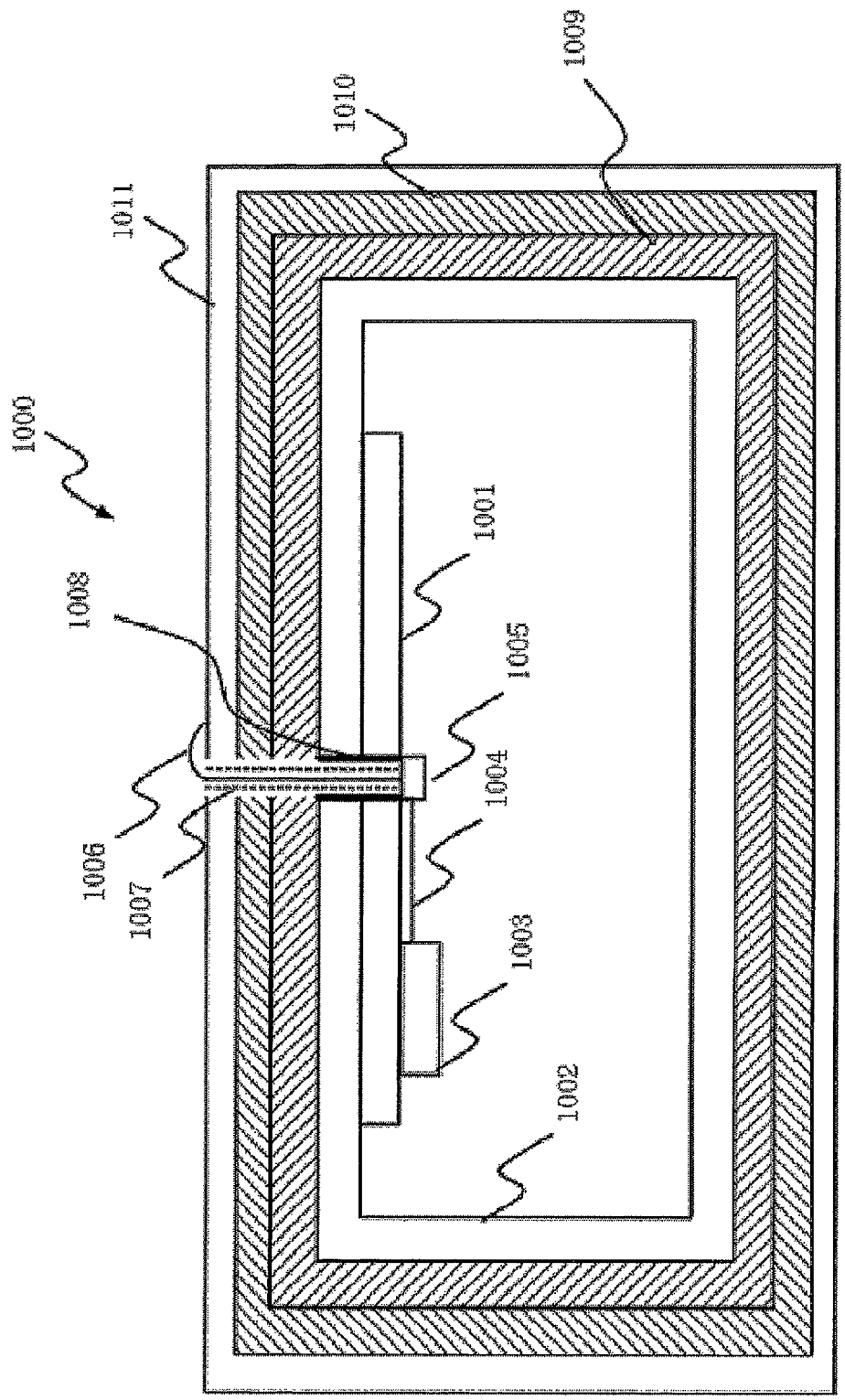
FIG. 10 is a diagram schematically showing a communication apparatus according to a fourth embodiment.

FIG. 10 is a cross-sectional diagram of the communication apparatus according to the fourth embodiment.

The external appearance of the communication apparatus 1000 is same as one according to the modification of the first embodiment (FIG. 1(*d*)). FIG. 10 shows a sectional view of the communication apparatus when the communication apparatus is cut so as to cut a communication circuit 1003 and a first signal line 1004. The communication apparatus 1000 has a first ground 1002. The first ground 1002 is hollow and it surrounds all sides of the communication circuit 1003. A supporting member 1009 is provided on an inner surface of a housing 1010, which is made of an insulator. A conductor 1011 surrounds the housing 1010. The first ground 1002 is provided on the supporting member 1009. A dielectric material layer 1001 is provided on an inner surface of the first ground 1002. The communication circuit 1003, the first signal line 1004, and a terminal 1005 are provided on one side of the dielectric material layer 1001. The dielectric material layer 1001, the communication circuit 1003, the first signal line 1004, the terminal 1005, the second signal line 1006, the housing 1010, and the conductor 1011 are the same as those explained in the first embodiment.

The terminal 1005 is connected to a second ground (not shown) and the first signal line 1004. The second ground is connected to the communication circuit 1003. The second ground is connected to the first ground 1002 via a through-hole 1008, an inner surface of which is coated or plated with metal. Therefore, the first ground 1002 and the second ground have the same electric potential.

A non-plated through-hole is formed through the conductor 1011, the housing 1010, and the supporting member 1009, and the non-plated through-hole is arranged in series with the through-hole 1008. A dielectric material 1007 is provided inside the non-plated through-hole and the through-hole 1008. A second signal line 1006 extends through a hole in the dielectric material 1007. The dielectric material 1007 supports the second signal line 1006. One side of the second signal line 1006 is connected to the first signal line 1004 via the terminal 1005. The other side of the second signal line 1006 is connected to the outer surface of the conductor 1011.

According to this embodiment, the first ground 1002 surrounds all sides of the dielectric material layer 1001. Therefore noise from components such as the communication circuit 1003 provided on the dielectric material 1001 and leaking to the outside can be reduced. The shape and configuration of the first ground 1002 is not limited. It can be cuboid, a spherical body, or the like. The terminal 1005 can be eliminated. In this case, the first signal line 1004 and the second signal line 1006 can be connected by soldering, and the communication circuit 1003 and outer surface of the conductor 1011 are connected by one signal line.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus comprising:
a substrate including a ground;
a communication circuit provided on the substrate;
a first signal line connected to the communication circuit;
an insulator surrounding the substrate in all directions and having a through-hole penetrating therethrough; and
a first conductor surrounding an outer surface of the insulator in all directions;
wherein the first signal line is electrically connected to the first conductor via the through-hole.

2. The apparatus according to claim 1, further comprising a terminal connected to the first signal line and a second signal line connected to the terminal, wherein the second signal line is connected to the first conductor.

3. The apparatus according to claim 1, further comprising an opening in the first conductor, wherein a distance between two points farthest from each other on an edge of the opening is shorter than $\lambda/2$, where $\lambda$ represents a wavelength of a signal having a maximum carrier frequency used in communication by the communication apparatus.

4. The apparatus according to claim 2, wherein the through-hole is electrically connected to the connected to the conductor, and wherein the second signal line is connected to the through-hole.

5. The apparatus according to claim 1, further comprising a terminal connected to the first conductor, a second signal line connected to the terminal, and a second conductor connected to the second signal line.

6. The apparatus according to claim 1, further comprising a second conductor, wherein a distance between the first conductor and the second conductor is shorter than $\lambda/(2\pi)$, where $\lambda$ represents a maximum wavelength of a signal having a carrier frequency used in communication by the communication apparatus.

7. The apparatus according to claim 1, wherein the ground surrounds the communication circuit.

8. The apparatus according to claim 1, wherein the substrate comprises a dielectric material layer, and the communication circuit is provided on the dielectric material layer.

9. The apparatus according to claim 6, wherein adjacent parts of the first conductor and the second conductor are arranged substantially in parallel.

10. The apparatus according to claim 1, wherein the through-hole is formed through both the insulator and the first conductor, wherein the first signal line is connected to an outer surface of the first conductor via the through-hole, and wherein the first conductor has no opening other than the through-hole.

11. The apparatus according to claim 1, wherein the first signal line is electrically connected to the first conductor by electrically connecting to an inner surface of the through-hole, the inner surface being coated with a conductive material.

12. A communication apparatus comprising:
a dielectric material layer;
a communication circuit provided on one side of the dielectric material layer;
a ground provided on the other side of dielectric material layer;
a first signal line connected to the communication circuit;
an insulator surrounding the ground in all directions; and
a first conductor surrounding an outer surface of the insulator in all directions, the insulator and the first conductor having a through-hole penetrating therethrough;
wherein the first signal line is electrically connected to an outer surface of the first conductor via the through-hole.

13. The apparatus according to claim 12, further comprising a terminal connected to the first signal line and a second signal line connected to the terminal, wherein the second signal line extends through the through-hole and the second signal line is connected to the outer surface of the first conductor.

14. The apparatus according to claim 12, further comprising an opening in the first conductor, wherein a distance between two points farthest from each other on an edge of the opening is shorter than $\lambda/2$, where $\lambda$ represents a wavelength of a signal having a maximum carrier frequency used in communication by the communication apparatus.

15. The apparatus according to claim 12, wherein the first conductor has no opening other than the through-hole.

16. The apparatus according to claim 12, further comprising a terminal connected to the first conductor, a second signal line connected to the second terminal, and a second conductor connected to the second signal line.

17. The apparatus according to claim 12, further comprising a second conductor, wherein a distance between the first conductor and the second conductor is shorter than $\lambda/(2\pi)$, where $\lambda$ represents a wavelength of a signal having a carrier frequency used in communication by the communication apparatus.

18. The apparatus according to claim 12, wherein the ground surrounds the communication circuit.

19. The apparatus according to claim 12, wherein the through-hole is formed through the insulator, the first conductor, the ground, and the dielectric material layer.

20. The apparatus according to claim 12, wherein the ground is a metal layer having a reference potential.

21. A communication apparatus comprising:
a dielectric material layer;
a communication circuit provided on the dielectric material layer;
a first signal line connected to the communication circuit;
a ground surrounding the dielectric material layer;
an insulator surrounding the ground in all directions; and
a first conductor surrounding an outer surface of the insulator in all directions, the insulator and the first conductor having a through-hole penetrating therethrough;
wherein the first signal line is electrically connected to an outer surface of the first conductor via the through-hole.

* * * * *